United States Patent [19]
Smith

[11] Patent Number: 5,658,107
[45] Date of Patent: Aug. 19, 1997

[54] BLIND RIVET

[75] Inventor: Daniel Robin Smith, Birmingham, United Kingdom

[73] Assignee: Emhart, Inc., Newark, Del.

[21] Appl. No.: 340,739

[22] Filed: Nov. 16, 1994

[30] Foreign Application Priority Data

Nov. 26, 1993 [GB] United Kingdom ............... 9324378

[51] Int. Cl.$^6$ ............................................. F16B 13/04
[52] U.S. Cl. .............................. 411/34; 411/15; 411/501; 29/243.53
[58] Field of Search ................... 411/34, 43, 37, 411/70, 501, 182, 553, 552, 551, 550; 292/177, 145, 163

[56] References Cited

U.S. PATENT DOCUMENTS

| | | | |
|---|---|---|---|
| 2,238,865 | 4/1941 | Purinton | 411/553 |
| 2,239,125 | 4/1941 | Summers | 411/552 |
| 2,283,526 | 5/1942 | Albin | 411/553 |
| 2,369,670 | 2/1945 | Gookin | 411/34 |
| 3,136,017 | 6/1964 | Preziosi | |
| 3,169,293 | 2/1965 | Neuschotz | 411/552 |
| 3,397,000 | 8/1968 | Nakanishi | 292/62 |
| 3,938,657 | 2/1976 | David | 206/343 |
| 5,469,610 | 11/1995 | Courian | 29/243.521 |

FOREIGN PATENT DOCUMENTS

| | | |
|---|---|---|
| 584286 | 9/1945 | United Kingdom . |
| 876255 | 8/1961 | United Kingdom . |
| 1389790 | 4/1975 | United Kingdom . |
| 1550802 | 8/1979 | United Kingdom . |
| 2051288 | 1/1981 | United Kingdom . |
| 2122937 | 1/1984 | United Kingdom . |

OTHER PUBLICATIONS

BF. Goodrich "Rivnuts" Aug. 1952.

*Primary Examiner*—Steven N. Meyers
*Assistant Examiner*—Tuyet-Phllong Pham
*Attorney, Agent, or Firm*—E. D. Murphy

[57] ABSTRACT

A blind rivet comprises a rivet body with an axial through bore, a head at one end and inwardly extending lugs at the tail which are provided with recesses. The rivet may be set by a tool having lugs adapted to engage in the recesses, and may be used as a drainage passage or as part of a releasable fastener.

5 Claims, 2 Drawing Sheets

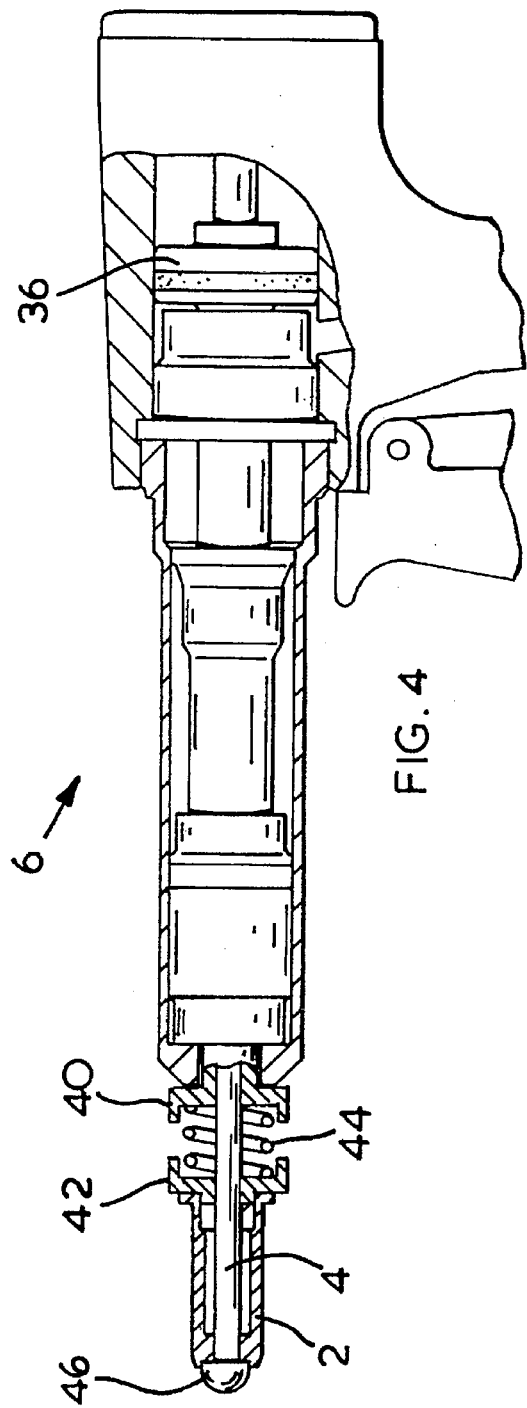
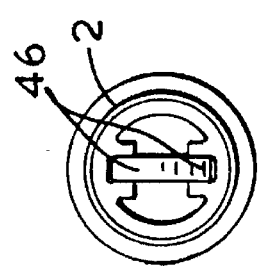
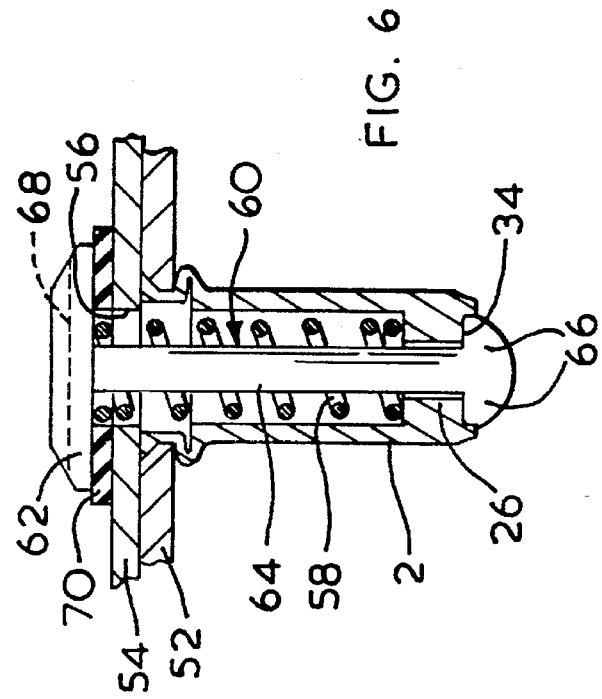
FIG. 4
FIG. 5
FIG. 6

BLIND RIVET

This invention is concerned with blind rivets.

BACKGROUND TO THE INVENTION

Blind rivets, that is to say rivets which can be set into a workpiece with access only to one side of the workpiece, have been suggested in many different configurations and for many different purposes. They can conveniently be divided into two classes, those which have an expendable mandrel assembled with a rivet body and those which are set with a mandrel which is part of a tool.

It is sometimes required, for example in the manufacture of automobiles, to secure a small tube to a workpiece for example to provide a drain hole. Such a small tube may conveniently be provided by a blind rivet but, because it is required to have a passage right through the rivet, blind rivets of the first class, that is to say those with an expendable mandrel, are not satisfactory as a head portion of the mandrel is often left in the rivet after setting, thus obstructing the passage through the rivet.

It is therefore desirable to provide a blind rivet which is set with a mandrel which is part of a tool which may conveniently be set in a workpiece to provide a small tube.

A rivet is described in UK 584286 which is adapted to be set by a mandrel of a setting tool comprising a rivet body having a tubular wall surrounding an axial bore which extends from a tail end portion to a head end portion of the rivet, a head flange at the head end portion of the rivet extending outwardly from the rivet body, abutment means at the tail end portion of the rivet and comprising diametrically opposed lugs extending generally radially inwards of the wall of the rivet body. When it is desired to set such a rivet, a mandrel having a cylindrical stem and outwardly extending setting lugs complementary in shape to the lugs of the rivet is passed through the axial bore of the rivet from the head flange outwardly of the tail end portion, the lugs of the mandrel passing between the lugs of the rivet. The mandrel is then rotated through a small angle to bring the lugs of the mandrel into line with the lugs of the rivet, and relative axial movement is then caused between the rivet and the mandrel to cause the rivet to be set, and the mandrel is then again rotated so that its lugs are in line with the gaps between the lugs of the rivet and the mandrel is withdrawn.

This procedure suffers from a serious disadvantage. By the nature of blind riveting the tail end portion of a rivet being set, and the lugs on the mandrel being used to set it, are not visible. For a reliable setting of the rivet it is an essential that the lugs on the mandrel be properly aligned with the lugs on the rivet, and there is no way that an operator can check that this is the case.

It is one of the objects of the present invention to provide a blind rivet which can reliably be set into a workpiece to provide a small tube fixed in the workpiece.

BRIEF STATEMENT OF THE INVENTION

The present invention provides a blind rivet adapted to be set by a mandrel of a setting tool, comprising a rivet body having a tubular wall surrounding an axial through bore which extends from a tail end portion to a head end portion of the rivet a head flange at the head end portion of the rivet extending outwardly from the body, abutment means at the tail end portion of the rivet comprising two diametrically opposed lugs extending generally radially inwards of the wall of the rivet body the lugs comprising diametrically aligned recesses facing towards the tail end of the rivet body.

Preferably in a blind rivet as set out in the last preceding paragraph the rivet body comprises a portion of the wall at the head end portion which is thinner than the remainder of the wall of the rivet body. In this case, when the rivet is set, the thinner portion of the wall is expanded by the pressure from the mandrel so that the rivet is set in a workpiece which is engaged on one side by the head flange and on the other by the expanded thinner portion of the wall.

The present invention also provides, in another of its aspects, a method of setting a blind rivet as set out in the last preceding paragraph but one comprising the use of a setting tool comprising a nosepiece, a mandrel extending through the nose piece and comprising a cylindrical stem and two diametrically opposed outwardly extending setting lugs, a supporting member mounted on the mandrel forwardly of the nose piece, a spring urging the supporting member and the nosepiece apart, and actuating means for causing relative movement of the nosepiece and the mandrel and comprising the steps of (a) placing the rivet on the mandrel with the head of the rivet engaging the supporting member with the mandrel extending through the rivet with the setting lugs of the mandrel located in the recesses of the lugs of the rivet (b) positioning the rivet on the mandrel in a hole in a workpiece (c) causing relative movement of the mandrel and the nosepiece to set the rivet and (d) rotating the mandrel to disengage the lugs of the mandrel from the lugs of the rivet and withdrawing the mandrel from the set rivet.

In the accompanying drawings

FIG. 4 shows diagrammatically a setting tool for the rivet;

FIG. 5 shows a view of a mandrel of the setting tool in engagement with the rivet;

FIG. 6 shows a use of the set rivet as part of a releasable fastener.

DESCRIPTION OF THE PREFERRED EMBODIMENT

Figure 1:
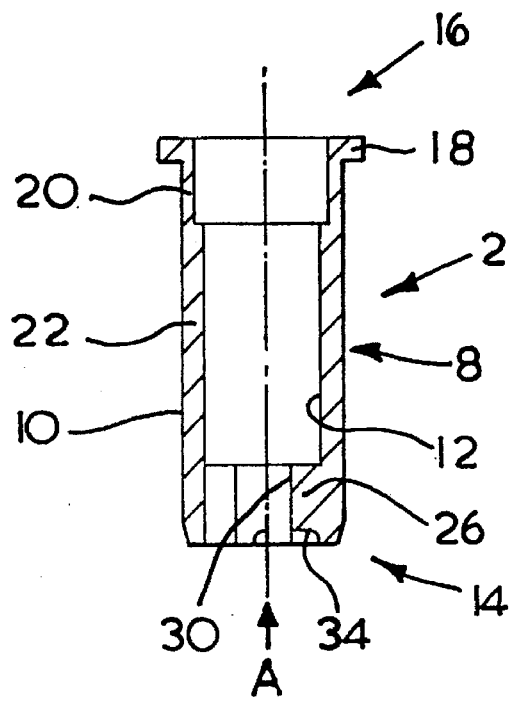
FIG. 1 shows a view in section along the line 1—1 of FIG. 2 of a rivet embodying the invention.
Figure 2:
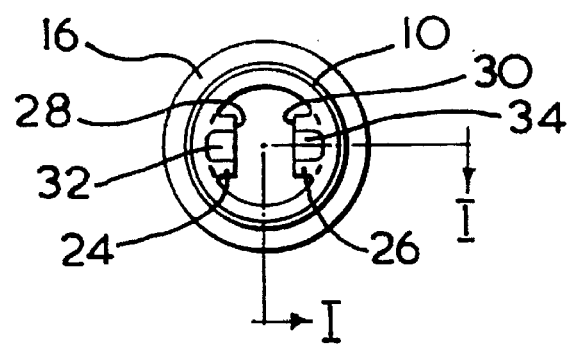
FIG. 2 shows a view in the direction A of FIG. 1.

The blind rivet 2 shown in FIGS. 1 and 2 is adapted to be set by a mandrel 4 of a setting tool 6 [FIG. 4].

The rivet 2 comprises a rivet body 8 having a tubular wall 10 surrounding an axial through bore 12 which extends from a tail end portion 14 to a head end portion 16 of the rivet 2. The rivet comprises a head flange 18 at the head end portion 16 of the rivet which is annular in shape and extends a short way outwardly from the body 8. The rivet may be made of an aluminum alloy.

The body 8 is of constant external diameter and comprises a portion 20 of the wall 10 adjacent the head end portion 16 which is thinner than the remainder of the wall of the rivet body, being about 60% of the thickness of a main portion 22 of the wall.

The rivet 2 comprises abutment means at the tail end portion of the rivet comprising two diametrically opposed lugs 24, 26 which extend generally radially inwards of the wall 10 of the rivet body. The lugs 24,26 have parallel flat inward faces 28,30 respectively, and the width of the faces is approximately equal to the distance between the two faces 28,30. Formed in the lugs 24,26 facing towards the tail end of the rivet 2 are two recesses, 32,34 which are semicircular in cross section and diametrically aligned with one another.

FIGS. 4 and 5 show, diagrammatically, the setting tool 6 which may be used to set the rivet 2. The tool 6 comprises actuating means in the form of a pneumatically operated piston 36 which supports the mandrel 4 extending outwardly through a nosepiece 40. A supporting member 42 is mounted on the mandrel 4 forwardly of the nosepiece 40 and a spring 44 urges the nosepiece 40 and the supporting member 42 apart. The mandrel 4 comprises a head comprising two diametrically opposed outwardly extending lugs 46.

Figure 3:
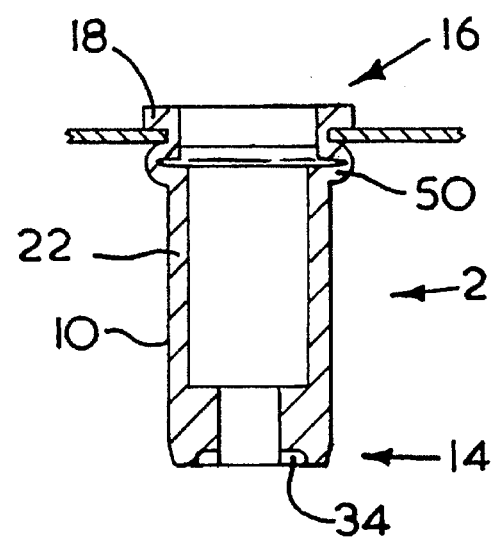
FIG. 3 shows, a view in cross section of the rivet set in a workpiece.

In operation, an operator takes a rivet 2 and threads it on to the mandrel 4 aligning the gaps between the lugs 24, 26 of the rivet with the lugs 46 on the mandrel head. The rivet is pushed onto the mandrel against spring pressure from the supporting member 42 until the lugs 46 pass out of the end of the rivet: the operator then rotates the rivet to align the lugs 46 of the mandrel 4 with the recesses 32, 34, and releases the rivet which is then held between the lugs 46 and the supporting member 42. The operator then positions the rivet in a hole in a workpiece and operates the tool to cause relative withdrawing movement of the mandrel 4 to set the rivet. As can be seen from FIG. 3, the thinner portion 20 of the wall of the rivet collapses under this setting operation, to form an annular bulge 50 so that the workpiece is clamped between the bulge 50 and the head 18 of the rivet, thus to secure the rivet in the workpiece. The operator then rotates the mandrel through 90° to allow its withdrawal from the set rivet.

The set rivet may conveniently be used to provide draining passages in, for example, automobile construction. An alternative use for the set rivet is to provide a part of a releasable fastener as illustrated in FIG. 6. The rivet 2 is set in a workpiece 52. A further workpiece 54 having a hole 56 is positioned against the workpiece 52 and a spring 58 positioned in the bore 12 of the rivet abutting against the lugs 26. A headed pin 60 comprising a head 62, a shank 64 and terminal lugs 66 (closely resembling the lugs 46 of the setting tool) is then positioned through a spring washer 70 into the bore 12, the lugs 66 passing between the lugs 26 of the rivet. The pin 60 is forced down against the spring washer 70 and then rotated through 90°, conveniently by a screwdriver in a slot 68 in the head 62, and the spring 58 and washer 70 then force the lugs 66 into the slots 32, 34 of the rivet. In this use the head 18 of the rivet is counter sunk to provide a flush fitting in the workpiece 52.

The invention claimed is:

1. A blind rivet adapted to be set by a mandrel of a setting tool, comprising a rivet body having a tubular wall surrounding an axial through bore which extends from a tail end portion to a head end portion of the rivet a head flange at the head end portion of the rivet extending outwardly from the body, abutment means at the tail end portion of the rivet comprising two diametrically opposed lugs extending generally radially inwards of the wall of the rivet body, said lugs comprising diametrically aligned recesses facing towards the tail end of the rivet body, said recesses forming part of said abutment means; said recesses extending axially into said lugs and terminating at an axially facing surface, said surface forming a floor in said recess for engagement by a setting tool.

2. A blind rivet according to claim 1 wherein a portion of the wall adjacent the head end portion of the rivet is thinner than the remainder of the wall of the rivet body.

3. A blind rivet according to claim 1 which is made of aluminum alloy.

4. A method of setting a blind rivet according to any one of the preceding claims comprising the use of a setting tool comprising a nosepiece a mandrel extending through the nosepiece and comprising a cylindrical stem and two diametrically opposed outwardly extending setting lugs a supporting member mounted on the mandrel forwardly of the nose piece a spring urging the supporting member and the nosepiece apart and actuating means for causing relative movement of the nosepiece and the mandrel and comprising the steps of (a) placing the rivet on the mandrel with the head of the rivet engaging the supporting member with the mandrel extending through the rivet with the setting lugs of the mandrel engaged in the recesses of the lugs of the rivet (b) positioning the rivet on the mandrel in a hole in a workpiece (c) causing relative movement of the mandrel and the nosepiece to set the rivet and (d) rotating the mandrel to disengage the lugs of the mandrel from the lugs of the rivet and withdrawing the mandrel from the set rivet.

5. A blind rivet adapted to be set by a mandrel of a setting tool, comprising a rivet body having a tubular wall surrounding an axial through bore which extends from a tail end portion to a head end portion of the rivet a head flange at the head end portion of the rivet extending outwardly from the body, abutment means at the tail end portion of the rivet comprising two diametrically opposed lugs extending generally radially inwards of the wall of the rivet body the lugs comprising diametrically aligned recesses facing towards the tail end of the rivet body, each of said recesses extending partially into one of said lugs and terminating at an axially facing abutment surface.

* * * * *